United States Patent
Smith

(10) Patent No.: US 8,110,237 B2
(45) Date of Patent: Feb. 7, 2012

(54) METHOD OF COOKING PEPPERS

(75) Inventor: James G. Smith, New York, NY (US)

(73) Assignee: James Smith, New York, NY (US)

( * ) Notice: Subject to any disclaimer, the term of this patent is extended or adjusted under 35 U.S.C. 154(b) by 267 days.

(21) Appl. No.: 12/239,617

(22) Filed: Sep. 26, 2008

(65) Prior Publication Data

US 2009/0087535 A1     Apr. 2, 2009

Related U.S. Application Data

(60) Provisional application No. 60/975,785, filed on Sep. 27, 2007.

(51) Int. Cl.
*A23C 3/00* (2006.01)

(52) U.S. Cl. ........... 426/523; 99/403; 99/419; 99/421 R; 99/426; 99/415; 426/241; 426/243; 426/466; 426/599

(58) Field of Classification Search .............. 426/599, 426/523, 241, 243, 466; 99/421 R, 419, 99/426, 403, 415
See application file for complete search history.

(56) References Cited

U.S. PATENT DOCUMENTS

| | | |
|---|---|---|
| 66,911 A | 7/1867 | Teller |
| 878,271 A | 2/1908 | Blackford |
| 921,932 A | 5/1909 | Wenzelman |
| 1,565,077 A | 12/1925 | Finn |
| 1,817,351 A | 8/1931 | Cookson |
| 1,890,907 A | 12/1932 | Hoover |
| 1,969,601 A | 8/1934 | Foch |
| 1,994,894 A | 3/1935 | Marcotte |
| 2,052,505 A | 8/1936 | Vetrosky |
| 2,152,023 A | 3/1939 | Botti |
| 2,345,049 A | 3/1944 | Hunter |
| 2,458,239 A | 1/1949 | Bartlett |
| 2,584,295 A | 2/1952 | Sanzenbacher |
| 2,766,682 A * | 10/1956 | Smith ........................... 99/419 |
| 2,859,685 A | 11/1958 | Alexander |
| 3,053,169 A * | 9/1962 | Rappaport ................. 99/421 R |
| D202,157 S | 8/1965 | Headberg |
| 3,379,118 A | 4/1968 | Perez |
| 3,392,665 A | 7/1968 | Harnest |
| 3,952,644 A | 4/1976 | Wales |
| 3,956,979 A | 5/1976 | Coroneos |
| 4,076,116 A | 2/1978 | Sowders |
| D252,090 S | 6/1979 | Julkenbeck |
| 4,272,669 A | 6/1981 | Yamanaka et al. |
| D262,709 S | 1/1982 | Williams et al. |
| 4,366,750 A | 1/1983 | Brown et al. |

(Continued)

OTHER PUBLICATIONS

Sweet Pepper., Dictionary of Food. International Food and Cooking Terms from A to Z.*

(Continued)

*Primary Examiner* — D. Lawrence Tarazano
*Assistant Examiner* — Assaf Zilbering
(74) *Attorney, Agent, or Firm* — Proskauer Rose LLP

(57) ABSTRACT

A cooking method for cooking a hollow food item with a wall having an exterior surface and an interior surface defining an interior volume, a plurality of skewers supporting the food item be piercing the wall through a stem side of the food item. The skewers maintaining the orientation of the food item with the stem side facing down and maintaining a minimum volume of the interior chamber to facilitate the accumulation of steam within the interior chamber.

6 Claims, 4 Drawing Sheets

U.S. PATENT DOCUMENTS

| | | | |
|---|---|---|---|
| 4,372,199 | A | 2/1983 | Brown et al. |
| 4,481,874 | A | 11/1984 | Greck |
| 4,557,188 | A | 12/1985 | Spanek |
| 4,589,333 | A | 5/1986 | Murphy |
| 4,735,135 | A * | 4/1988 | Walker .................. 99/424 |
| 4,887,523 | A | 12/1989 | Murphy et al. |
| 4,896,011 | A | 1/1990 | Trucks |
| 4,924,768 | A * | 5/1990 | Jay ...................... 99/425 |
| 5,069,117 | A * | 12/1991 | Schlessel ............... 99/419 |
| 5,154,116 | A | 10/1992 | Dube |
| 5,174,196 | A | 12/1992 | Cheatham |
| 5,685,217 | A | 11/1997 | Kreitzer |
| 5,730,046 | A | 3/1998 | Battaglia et al. |
| 5,749,286 | A | 5/1998 | Payette |
| 5,797,312 | A * | 8/1998 | Brant .................... 99/415 |
| 5,813,321 | A | 9/1998 | Bourgeois |
| 5,836,239 | A | 11/1998 | Shapiro |
| 6,047,633 | A | 4/2000 | Khaytman |
| 6,192,792 | B1 | 2/2001 | Gremillion |
| 6,330,851 | B1 | 12/2001 | Riesselmann |
| 6,945,161 | B1 | 9/2005 | Battaglia et al. |
| 7,000,529 | B2 | 2/2006 | Sculuca |
| 7,107,898 | B2 | 9/2006 | Sculuca |
| 7,124,901 | B2 | 10/2006 | Stoupa |
| 7,225,730 | B2 | 6/2007 | Backus et al. |
| 2003/0005828 | A1* | 1/2003 | McLemore et al. ...... 99/403 |
| 2003/0051607 | A1 | 3/2003 | Cassell et al. |
| 2005/0279223 | A1 | 12/2005 | McPeak |

OTHER PUBLICATIONS

Roasted Vegetables., The New Best Recipe. pp. 135, 175-177.*
Cooking., The Hutchinson Unabridged Encyclopedia with Atlas and Weather guide.*
How-to-Roast-Peppers-on-a-Gas-Stove., from www.wikihow.com. Available online on Sep. 2, 2007 at http://web.archive.org/web/20070902080753/http://www.wikihow.com/Roast-Peppers-on-a-Gas-Stove.*
Steam., Mechanical Engineers_Handbook—Energy and Power (3rd Edition).*
Sweet Pepper., Dictoinary of Food. International Food and Cooking Terms from A to Z. Available online at www.credoreference.com since 2005.*
Roasted Vegetables., The New Best Recipe. pp. 135, 175-177 (2004).*
Cooking., The Hutchinson Unabridged Encyclopedia with Atlas and Weather Guide. Available online at www.credoreference.com since 2009.*
Steam., Mechanical Engineers Handbook—Energy and Power (3rd Edition). Available online at www.knovel.com since Aug. 22, 2007.*
http://www.campchef.com/catalog/item/6/64/0/RIBRK/117/Rib+Rack.html; Sep. 24, 2008; (2 pages).
http://www.campchef.com/catalog/item/6/64/0/BCH1/20/The+Roost+Beer+Can+Chicken+Holder.html; Sep. 24, 2008; (2 pages).
http://www.campchef.com/catalog/item/6/64/0/BCH2/21/The+Twiins+Beer+Can+Chicken+Holder.html; Sep. 24, 2008; (2 pages).
http://www.campchef.com/catalog/item/6/64/0/TKYC/155/Turkey+Cannon.html; Sep. 24, 2008; (3 pages).
http://www.barbecues.com/web/catalog/product_detail.aspx?pid=70202; Sep. 24, 2008; (2 pages).
http://www.barbecues.com/web/catalog/product_detail.aspx?pid=293162; Sep. 24, 2008; (2 pages).
http://www.grillfinity.com/products.php?c=Skewers; Sep. 24, 2008; (2 pages).
http://store.weber.com/Items/GrillingTools/Detail.aspx?pid=1280; Sep. 24, 2008; (1 page).
http://store.weber.com/Items/GrillingTools/Detail.aspx?pid=1281; Sep. 24, 2008; (1 page).
http://store.weber.com/Items/GrillingTools/Detail.aspx?pid=1269; Sep. 24, 2008; (1 page).
http://www.recipetips.com/print-tips/t—1099/grilling-tools.asp?ProcessPrint=true&Print/Category; Sep. 24, 2008; pp. 1-7.
http://swedesspecialties.com/Sili%20Gourmet%20(Silicon%20KitchenTools).htm; Sep. 24, 2008; pp. 1-4.
Bayou Classics, Catalog 2008, 2008 Barbour International, Inc. 48 pages.; www.bi2.com/index.html.

* cited by examiner

METHOD OF COOKING PEPPERS

RELATED APPLICATIONS

This application claims priority to U.S. Provisional Patent Application No. 60/975,785, filed Sep. 27, 2007, the entirety of which is hereby incorporated by reference.

TECHNICAL FIELD

This invention relates generally to methods of cooking. More specifically, this invention relates to a method of cooking hollow food items, such as peppers, having a wall with interior and exterior surfaces and an interior chamber whereby the interior and exterior surfaces experience different cooking effects.

BACKGROUND OF THE INVENTION

Roasting methods have involved the disposing of food items in a sideways disposition upon a spit or pan, or sideways upon a rack positioned over an open flame. Such methods provide heat to the food item that is not evenly distributed across the surface of the food item, which is believed to result in the uneven cooking of the food item. Such methods also provide substantive direct contact between a heated surface and the food item, which is believed to cause uneven cooking and result in burning of portions of the food item. It is also believed that such methods are disadvantageously time consuming and labor intensive because the methods require constant monitoring of the cooking process and rotation of the food item.

SUMMARY OF THE INVENTION

The instant invention is a method of cooking a hollow food item that has a wall with an exterior surface having a skin and an interior surface defining an interior chamber. The method preferably includes identifying a side of the food item where a stem is located, disposing the stem side of the hollow food item on a cooking apparatus having a plurality of skewers that are inserted through the stem side portion of the wall into the interior chamber, suspending the food item on ends of the skewers with the stem side of the food item facing the base of the cooking apparatus, maintaining a minimum size and shape of the interior chamber with the skewers, heating the food item using a mixture of convection and/or radiant heating and steam, and removing the skin from the wall of the food item.

Suspending hollow food items during cooking advantageously allows any coating on the food item, such as an oil, to spread evenly over the exterior surface of the food item without "pooling" of the coating, for example, under the food item. In existing methods, pooling is believed to interfere with achieving an even cooking of the food item. Suspension also advantageously exposes the surfaces of the food item to an even distribution of heat on the exterior of the food item, while it is believed that existing methods cause an uneven distribution of heat due to significant conduction through direct contact with, for example, a metal pan. Presenting a downward-facing stem side of the food item also advantageously positions the food item in an orientation that places the undamaged skin of the food item around and above the interior chamber and permits the creation of a pocket of steam within the interior chamber of the food item, with the walls and skin of the food item hold the rising steam within the interior chamber. It is believed that hollow food items that are positioned sideways, with the stem side facing sideways or upwards, permit steam to escape from the interior chamber of the hollow food item, which provides uneven and undesirable cooking effects. The arrangement of prongs or skewers in a vertical arrangement also advantageously provides a structure that holds the food item at an elevation in the cooking environment with the stem side of the food item facing down, and the skewers advantageously maintain a minimum volume of the interior cavity of the food item throughout the cooking process.

BRIEF DESCRIPTIONS OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION

Figure 1:
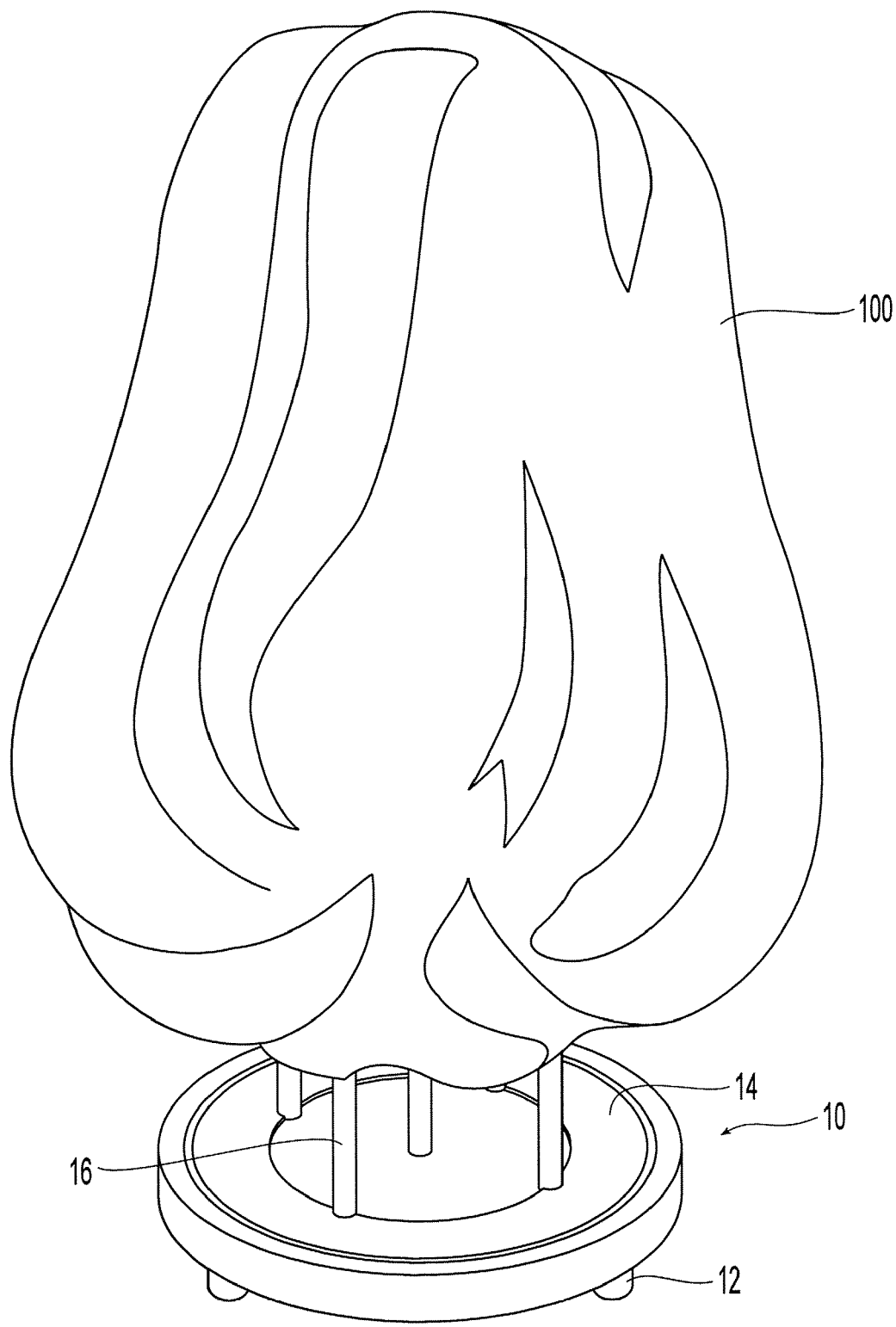
FIG. 1 is a perspective view of a thin-walled, hollow food item disposed in a preferred orientation on the skewers of the preferred embodiment of the cooking apparatus.

Referring now to the figures, the present invention provides a method of cooking a hollow food item 100 having a wall 20 with an exterior surface having a skin 30 and an interior surface 40 defining an interior chamber 50. The method of cooking may be used to cook food items in an oven, on a grill or barbeque, or using another suitable cooking device. The method preferably uses a cooking apparatus 10 that pierces the wall 20 of the food item with skewers 11, 15. The method of cooking preferably includes identifying a stem 70 of the food item 100, disposing the food item on a plurality of skewers 11, 15 that are adapted to be inserted into the interior chamber 50 through the portion of the wall 20 having the stem 70, suspending the food item on ends of the skewers 11, 15 above a surface of a base 14, heating the food item, and separating the skin from the wall.

Preferably, the insertion of the skewers 11, 15 supports the food item so that the stem 70 portion of the food item faces downward towards base 14 and so that the skin 30 surrounds the sides and upper surface of the orientated food item. Orientating the stem 70 towards the bottom of the orientated food item allows the food item 100 to be cooked by a mixture of convection and/or radiant heating and by steam heating when disposed on the skewers 11, 15 of the cooking apparatus 10, with the convection/radiant heating provided by an oven or grill and the steam heating resulting from steam generated in the interior chamber 50 during the cooking process as moisture in the wall 20 turns into steam. It is believed that the skin 30 provides an envelope that retains steam within the interior chamber 50, that the skin 30 is less permeable to steam than the stem 70, and that an orientation having the stem 70 facing downward facilitates a higher content of steam in the interior chamber 50 than would be achieved if the stem was disposed towards the side or top of the orientated food item. Preferably, as illustrated in FIG. 1, the cooking apparatus 10 also supports the wall 20 defining the interior chamber 50 so that a minimum size and volume of the interior chamber is maintained. With the food item supported from the inside by multiple skewers 11, 15, the interior surface 40 of the food item is heated, in part, by upwardly-rising steam that accumulates in the chamber 50, and the exterior surface of the food item and the skin 30 is heated by convection and/or radiant heating. This mixture of convection and/or radiant heating and steam heating of the food item causes a first cooking effect to the wall 20 and the inwardly-facing portions of the wall 20, and a different second cooking effect in the skin 30. Preferably, the first cooking effect is a softening of the wall by steaming and the second cooking effect is a charring of the skin by convection heating. Alternatively, the second cooking effect is a charring of the skin from thermal radiation provided by, for example, burning coals of a grill, or by direct exposure to a flame, or by a combination of convection and radiant heating. Also alternatively, the second cooking effect is the blistering of the skin.

Figure 2:
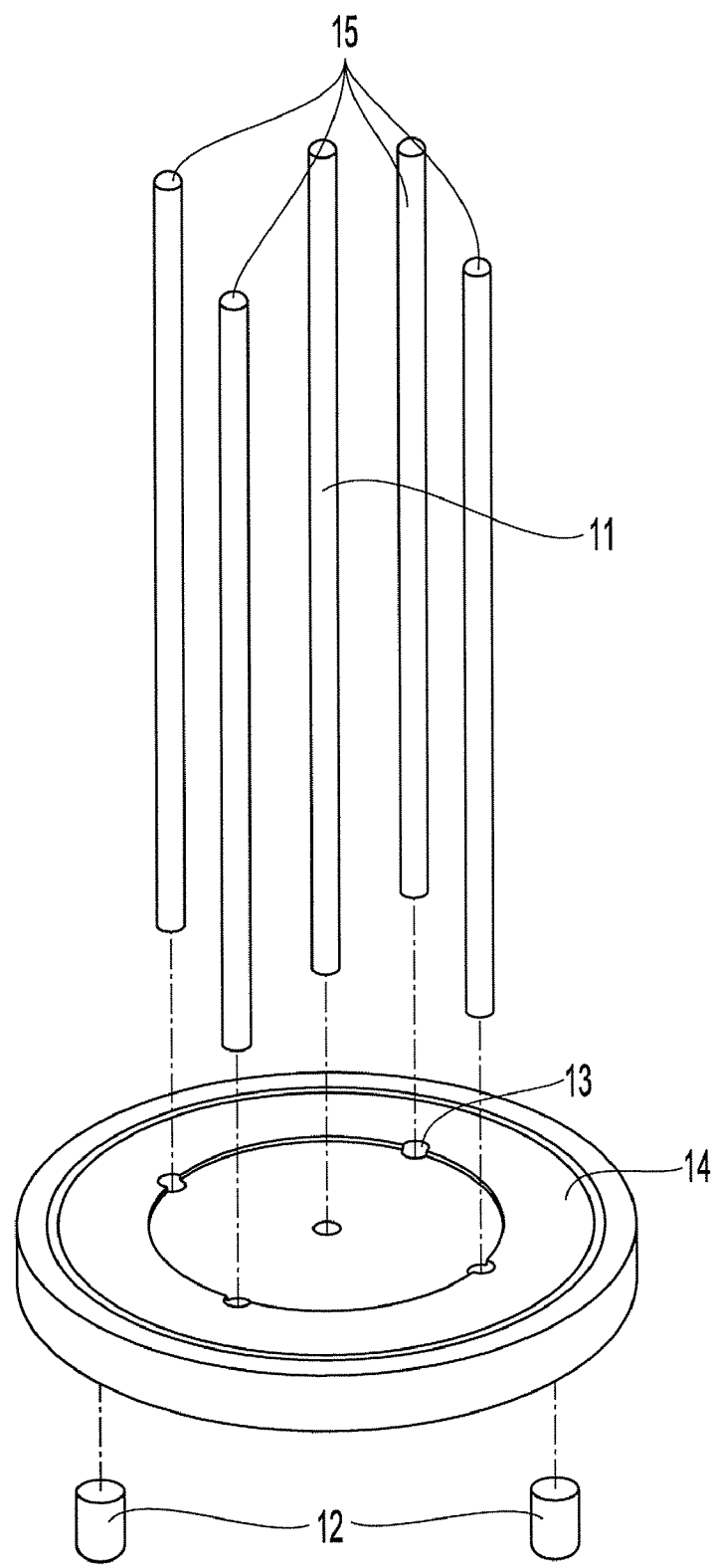
FIG. 2 is an exploded perspective view of the cooking apparatus of FIG. 1 showing a preferred configuration of the cooking apparatus.
Figure 3:
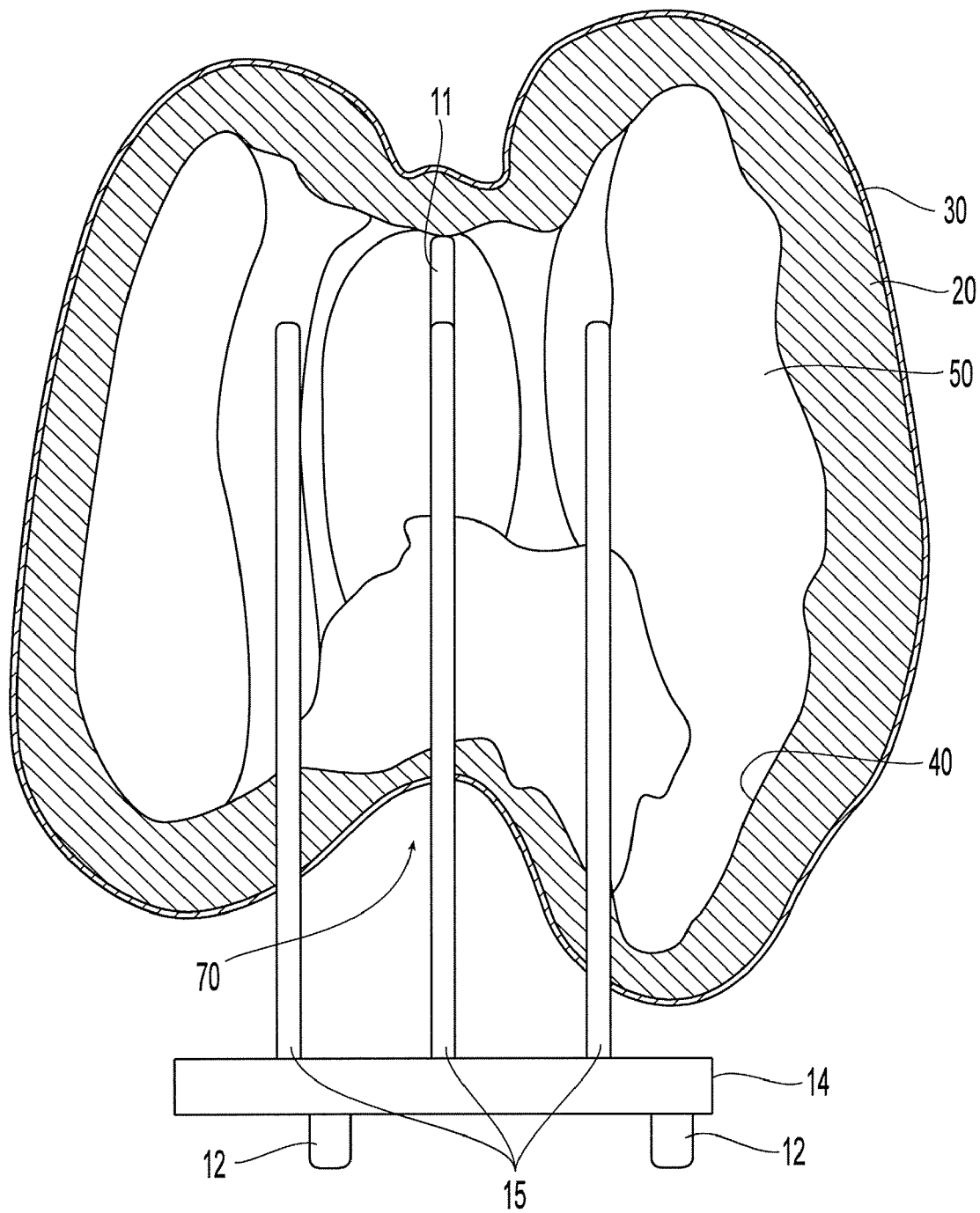
FIG. 3 is a cross-sectional view of the embodiment of FIG. 1 showing a preferred arrangement and orientation of the food item on the skewers.
Figure 4:
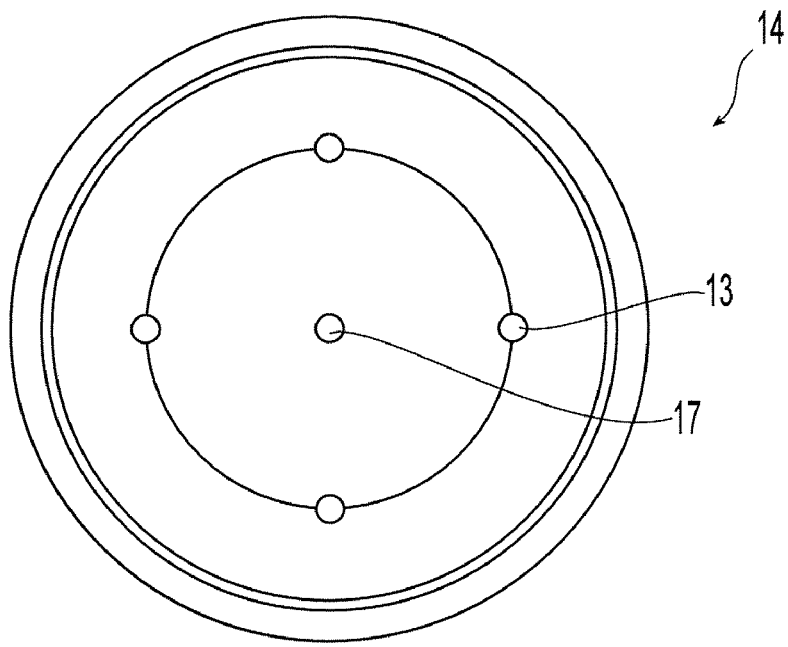
FIG. 4 is a top plan view of the cooking apparatus of FIG. 1 showing a preferred arrangement of the skewers on a base of the cooking apparatus.

The food item is preferably disposed on a plurality of skewers adapted to be inserted into the interior chamber 50 of the food item. The food item is preferably suspended on ends of the skewers 11, 15 with the stem 70 facing a cooking surface of the base 14. The food item is impaled on ends of the skewers and a portion of the wall 20 rests on the ends of the skewers in an arrangement that depends on, for example, the thickness or hardness of the wall 20 or the amount of stability desired for the particular cooking application. In the preferred embodiment, the cooking apparatus 10 comprises five elongated skewers 11, 15 extending from a base 14, as illustrated in FIG. 2. The skewers are preferably orientated vertically. The skewers are further preferably aligned to help ensure that a minimum size and volume of the interior chamber 50 is maintained. In the embodiment illustrated in FIGS. 2 and 4, the cooking apparatus 10 includes a single skewer 11 located at the center of the base 14, and four shorter skewers 15 surrounding the center skewer 11 in a circular configuration on the base 14, spaced apart from one another by approximately 90 degrees around the center skewer 11. Alternative arrangements capable of maintaining the desired size and volume of the interior chamber are also envisioned, such as a skewer pattern having no center skewer 11, or a pattern having an arrangement of fewer skewers. In a preferred embodiment, the skewers 11, 15 are removable from the base 14.

The advantages of suspending the food item during cooking include, among others, allowing any coating that is applied to the food item 100 to spread evenly over the exterior surface without pooling in, for example, spaces between the food item and a supporting pan in which the food item is disposed. It is believed that full exposure of the exterior surface of the food item by suspension on skewers allows even heating over the exterior surface of the food item by convection or radiant heating. The vertical or near vertical arrangement of skewers about the base also maintains a minimum volume of the interior chamber 50 throughout the cooking process, which facilitates the accumulation of steam in the interior chamber 50. Preferably, a coating is applied to the food item before the food item is heated. The coating preferably includes one or more of oil, salt, seasoning, and water, and most preferably is oil.

Preferably, the suspended food item 100 is heated in an oven, on a grill, or with another suitable cooking device. The suspended food item is further preferably heated using a mixture of convection heat, radiant heat, and steam. The exterior surface of the food item, including the skin 30, is preferably heated primarily by convection or radiant heating that is generated by the cooking device. The interior surface of the food item defining the interior chamber 50 is preferably exposed to steam generated by the heating of the wall 20 and by the moisture provided by the wall 20. Steaming of the food item 100 preferably occurs when upwardly-rising steam develops in the moisture-rich environment of the interior chamber 50 and becomes trapped in the chamber 50 and remains in contact with the interior surface 40.

Figure 5:
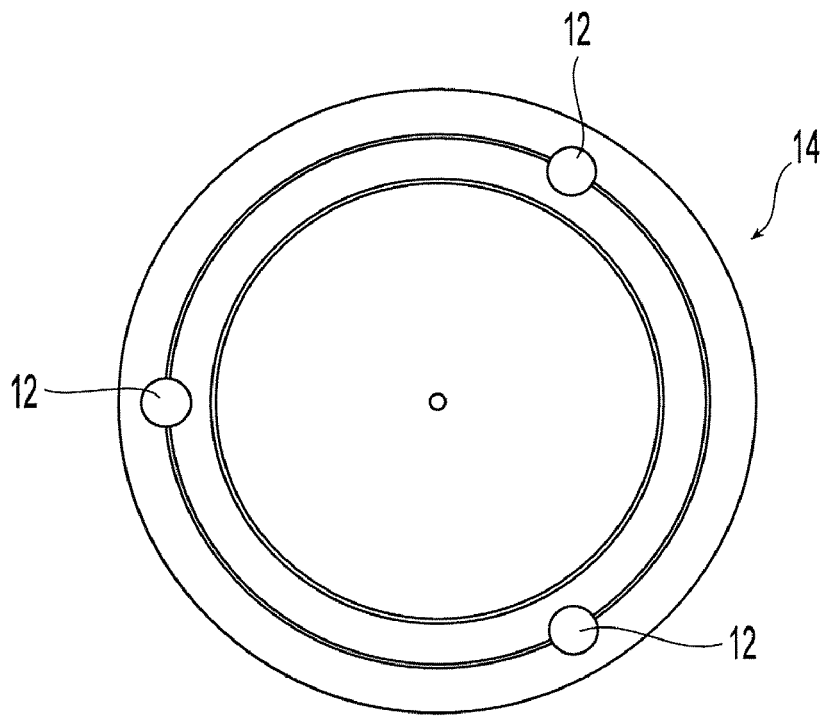
FIG. 5 is a bottom plan view of the cooking apparatus of FIG. 1 showing a preferred arrangement of feet on a base of the cooking apparatus.

Preferably, the base 14 is made of a durable, conductive material. The base 14 preferably is sufficiently large and/or heavy so as to stabilize the cooking apparatus 10 on a cooking surface (e.g., a grill rack). The base also preferably has feet 12 adapted to grip a cooking surface and stabilize the cooking apparatus throughout the cooking process. In a preferred embodiment, as shown in FIG. 5, the cooking apparatus 10 has three circumferentially-spaced feet 12. The base 14 also preferably has holes 13, 17 that accept the insertion of the skewers 11, 15 into the base.

Heating the food item using a mixture of convection or radiant heating and steaming preferably causes a first cooking effect in the wall 20 of the food item and a second cooking effect in the skin 30. In an especially preferred embodiment, the first cooking effect is a softening of the wall by steaming and the second cooking effect is a charring of the skin by convection and/or radiant heating.

The preferred method of cooking further includes removing the skin 30 of the food item 100 prior to consumption or storage. Removing the skin 30 includes peeling the skin 30 back from the wall 20. Alternatively, the removal of the skin also includes slicing the food item into smaller pieces or sections, flattening the food item pieces or sections, and pinching each of the pieces or sections to raise and separate the skin from the wall.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

I claim:

1. A method of cooking a pepper having a stem and a wall with an exterior surface covered by a skin and an interior surface defining an interior chamber of the pepper, comprising:

identifying a stem side of the pepper;
   providing a pepper roaster comprising: a conductive base and a plurality of five skewers inserted through holes in a first surface of the conductive base positioned such that the position of the five skewers is substantially unchanged and the five skewers are substantially vertical with respect to the conductive base;
   suspending the pepper on ends of the five skewers above the conductive base wherein said end of the five skewers are inserted through the stem side of the pepper and into the interior chamber;
   heating the pepper to cause a softening of the wall and a charring of the skin; and
   separating the skin from the wall.

2. The method of claim 1 wherein the softening of the wall is caused by steam.

3. The method of claim 1, further comprising applying a coating to the pepper.

4. The method of claim 1, further comprising heating for a time sufficient to accumulate upwardly-rising steam within the interior chamber.

5. The method of claim 1, the heating including heat communicated from a heat source to the skin by at least one of convection and radiant heating.

6. The method of claim 1, wherein
heating the pepper further comprises using convection heating, radiant heating, and steam whereby the skin of the pepper is heated by convection and radiant heating and the interior surface is heated by upwardly-rising steam that accumulates in the interior chamber.

* * * * *